(12) United States Patent
Vrzic et al.

(10) Patent No.: US 8,761,115 B2
(45) Date of Patent: Jun. 24, 2014

(54) METHOD AND SYSTEM FOR PROVIDING AN UPLINK STRUCTURE AND MINIMIZING PILOT SIGNAL OVERHEAD IN A WIRELESS COMMUNICATION NETWORK

(75) Inventors: Sophie Vrzic, Nepean (CA); Jun Yuan, Ottawa (CA); Mo-Han Fong, Ottawa (CA); Robert Novak, Stittsville (CA); Dong-Sheng Yu, Ottawa (CA); Jianglei Ma, Kanata (CA)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 12/989,044

(22) PCT Filed: Apr. 21, 2009

(86) PCT No.: PCT/CA2009/000523
§ 371 (c)(1),
(2), (4) Date: Jun. 21, 2011

(87) PCT Pub. No.: WO2009/129613
PCT Pub. Date: Oct. 29, 2009

(65) Prior Publication Data
US 2011/0261781 A1    Oct. 27, 2011

Related U.S. Application Data

(60) Provisional application No. 61/046,596, filed on Apr. 21, 2008, provisional application No. 61/050,303, filed on May 5, 2008.

(51) Int. Cl.
*H04W 72/00* (2009.01)

(52) U.S. Cl.
USPC .......................................................... 370/330

(58) Field of Classification Search
USPC ................. 370/328, 329, 330, 203, 343, 344; 455/422.1, 450
See application file for complete search history.

(56) References Cited

U.S. PATENT DOCUMENTS

| | | | |
|---|---|---|---|
| 6,850,504 | B1 | 2/2005 | Cao et al. |
| 7,340,256 | B2 | 3/2008 | Speight |

(Continued)

FOREIGN PATENT DOCUMENTS

| | | |
|---|---|---|
| CN | 101155163 A | 4/2008 |
| WO | 9738502 A2 | 10/1997 |
| WO | 2007091811 A1 | 8/2007 |

OTHER PUBLICATIONS

International Search Report and Written Opinion dated Aug. 12, 2009 for International Application No. PCT/CA2009/000523, International Filing Date Apr. 21, 2009 (19 pages).

(Continued)

*Primary Examiner* — Paul H Masur
(74) *Attorney, Agent, or Firm* — Meyertons, Hood, Kivlin, Kowert & Goetzel, P.C.

(57) ABSTRACT

Methods and systems for providing uplink control in a wireless communication network are described herein. The wireless communication network includes at least one base station that is communicatively coupled to at least one mobile terminal. A method includes providing a dedicated random access channel to communicatively couple the base station and the mobile terminal; initiating the mobile terminal to select a random access signaling identification; generating a resource request at the at least one base station to receive uplink resource information from the mobile terminal; and receiving an initial access information request from the at least one mobile terminal to configure the base station connection.

18 Claims, 7 Drawing Sheets

(56) References Cited

U.S. PATENT DOCUMENTS

| | | |
|---|---|---|
| 2006/0105772 A1* | 5/2006 | Khawand et al. ............. 455/450 |
| 2007/0189205 A1* | 8/2007 | Terry et al. .................... 370/328 |
| 2008/0070610 A1 | 3/2008 | Nishio |
| 2008/0095185 A1* | 4/2008 | DiGirolamo et al. ......... 370/464 |
| 2008/0113684 A1* | 5/2008 | Jung et al. .................. 455/552.1 |
| 2008/0233992 A1* | 9/2008 | Oteri et al. .................... 455/522 |

OTHER PUBLICATIONS

Office Action and translation thereof in related Chinese Patent Application No. 200980120964.7, Mar. 11, 2013, pp. 1-13.

Chinese Patent No. 1965602, issued on May 16, 2007, inventor Akihiko Nishio, entitled "Communication terminal device, base station device, and radio communication system;" cited above as corresponding U.S. Appl. No. 20080070610, published Mar. 20, 2008.

\* cited by examiner

METHOD AND SYSTEM FOR PROVIDING AN UPLINK STRUCTURE AND MINIMIZING PILOT SIGNAL OVERHEAD IN A WIRELESS COMMUNICATION NETWORK

CROSS-REFERENCE TO RELATED APPLICATIONS

This application is a Submission Under 35 U.S.C. §371 for U.S. National Stage Patent Application of International Application Number: PCT/CA2009/000523, filed Apr. 21, 2009 entitled "METHOD AND SYSTEM FOR PROVIDING AN UPLINK STRUCTURE AND MINIMIZING PILOT SIGNAL OVERHEAD IN A WIRELESS COMMUNICATION NETWORK," which claims priority to U.S. Provisional Application Ser. No. 61/046,596, filed Apr. 21, 2008 and U.S. Provisional Application Ser. No. 61/050,303, filed May 5, 2008, the entirety of all which are incorporated herein by reference.

FIELD OF THE INVENTION

The present invention relates to the field of wireless communications and more particularly to a method and system for providing an uplink control structure and a pilot signal that utilizes minimum overhead to provide channel estimation and data demodulation in the wireless communication network.

BACKGROUND OF THE INVENTION

Wireless communication networks, such as cellular networks, operate by sharing resources among the mobile terminals operating in the communication network. As part of the sharing process, one or more controlling devices allocate system resources relating to channels, codes, among other resources. Certain types of wireless communication networks, e.g., orthogonal frequency division multiplexed ("OFDM") networks, are used to support cell-based high speed services such as those under the IEEE 802.16 standards. The IEEE 802.16 standards are often referred to as WiMAX or less commonly as WirelessMAN or the Air Interface Standard.

OFDM technology uses a channelized approach and divides a wireless communication channel into many sub-channels which can be used by multiple mobile terminals at the same time. These sub-channels can be subject to interference, which may cause data loss.

A system and method are needed for providing an uplink control structure and a pilot signal for obtaining channel information during uplink operations from the mobile terminals to the base station using minimum signal overhead. Existing systems do not employ uplink control structures. To the extent that pilot symbols are provided, the pilot symbols are arranged in a fixed pattern that is predefined for preselected resource block sizes. A system and method are proposed below that provide an uplink control structure and an efficient pilot signal having adaptive density and allocation design and which are scalable for different size resource blocks.

SUMMARY OF THE INVENTION

The invention advantageously provides a method and system for providing an uplink control structure and a pilot signal that utilizes minimum overhead to provide channel estimation and data demodulation in the wireless communication network.

A method is provided for uplink control in a wireless communication network, wherein the wireless communication network includes at least one base station that is communicatively coupled to at least one mobile terminal. A dedicated random access channel is provided to communicatively couple the base station and the mobile terminal so that the mobile terminal can select a random access signaling identification. A resource request is received at the base station to uplink resource information from the mobile terminal and an initial access information request is received from the mobile terminal to configure the base station connection.

The invention also provides a method of generating a low density pilot symbol pattern. A first resource block is provided having a first axis that defines a time domain and a second axis that defines a frequency domain, the first resource block having a predefined pilot symbol pattern, including boundary pilot symbols. A second resource block is provided having a third axis that defines a time domain and a fourth axis that defines a frequency domain; replicating the predefined pilot symbol pattern from the first resource block to the second resource block. The first resource block and the second resource block are concatenated to establish a first boundary line between the first resource block and the second resource block. Boundary pilot symbols are maintained in a first area of the first resource block, wherein the first area is positioned along the first axis at an end opposite to the first boundary line. The boundary pilot symbols are maintained in a second area of the second resource block, wherein the second area is positioned along the fourth axis at an end opposite to the first boundary line. Pilot symbols are deleted at the boundary between the first resource block and the second resource block adjacent to the first boundary line and spacing of the remaining pilot symbols is adjusted between the first area and the second area to provide uniform spreading of the pilot symbols.

The invention also provides a method of generating a high density pilot symbol pattern. A concatenated structure is provided that includes a first resource block having a first axis that defines a time domain and a second axis that defines a frequency domain, a second resource block having a third axis that defines a time domain and a fourth axis that defines a frequency domain, and a third resource block having a fifth axis that defines a time domain and a sixth axis that defines a frequency domain, wherein a first boundary line is established between the first resource block and the second resource block and a second boundary line is established between the second resource block and the third resource block. A predefined pilot symbol pattern is provided within the concatenated structure, the predefined pilot symbol pattern includes first boundary pilot symbols provided in a first area of the first resource block that is positioned along the first axis at an end opposite to the first boundary line and second boundary pilot symbols provided in a second area of the third resource block that is positioned along the fifth axis at an end opposite to the second boundary line. The third resource block is deleted. Third boundary pilot symbols are provided in a third area of the second resource block that is positioned along the third axis at an end opposite the first boundary line and spacing of the pilot symbols is adjusted between the first area and the third area to provide uniform spreading of the pilot symbols.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As an initial matter, while certain embodiments are discussed in the context of wireless networks operating in accordance with the IEEE 802.16 broadband wireless standard, which is hereby incorporated by reference, the invention is not limited in this regard and may be applicable to other broadband networks including those operating in accordance with other OFDM orthogonal frequency division ("OFDM")-based systems, including the 3rd Generation Partnership Project ("3GPP") and 3GPP2 evolutions. Similarly, the present invention is not limited solely to OFDM-based systems and can be implemented in accordance with other system technologies, e.g., CDMA.

Figure 1:
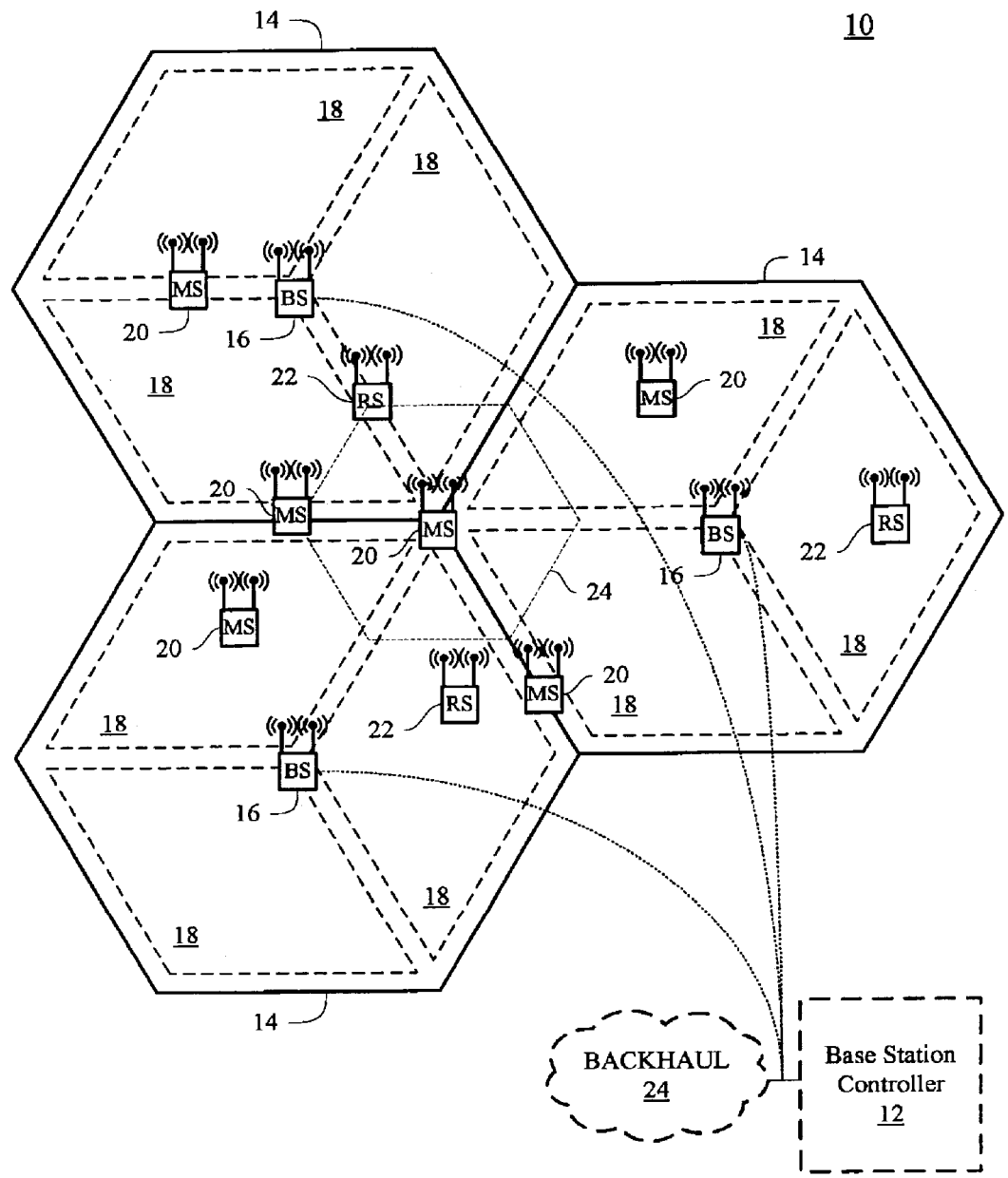
FIG. 1 is a block diagram of an exemplary cellular communication system constructed in accordance with the principles of the present invention.

Referring now to the drawing figures in which like reference designators refer to like elements, there is shown in FIG. 1, an exemplary communication system 10 is provided in accordance with the principles of the present invention. Communication system 10 includes a base station controller ("BSC") 12 which controls wireless communications within multiple cells 14, which cells are served by corresponding base stations ("BS") 16. In some configurations, each cell is further divided into multiple sectors 18 or zones (not shown). In general, each base station 16 facilitates communications using orthogonal frequency division multiplexing ("OFDM") with mobile and/or mobile terminals 20, which are within the cell 14 associated with the corresponding base station 16. The movement of the mobile terminals 20 in relation to the base stations 16 results in significant fluctuation in channel conditions. As illustrated, the base stations 16 and mobile terminals 20 may include multiple antennas to provide spatial diversity for communications. In some configurations, relay stations 22 may assist in communications between base stations 16 and mobile terminals 20. Mobile terminals 20 can be handed off from any cell 14, sector 18, zone (not shown), base station 16 or relay 22 to another cell 14, sector 18, zone (not shown), base station 16 or relay 22. In some configurations, base stations 16 communicate with each other and with another network (such as a core network or the internet, both not shown) over a backhaul network 24. In some configurations, a base station controller 12 is not needed.

Figure 2:
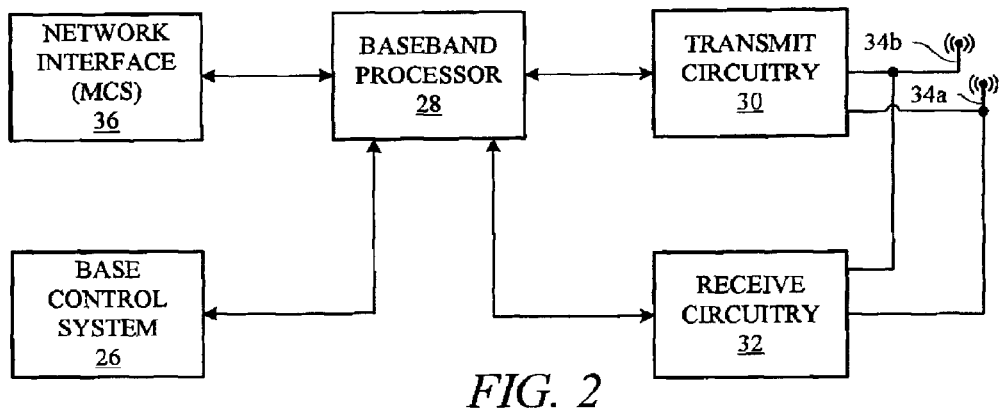
FIG. 2 is a block diagram of an exemplary base station constructed in accordance with the principles of the present invention.

With reference to FIG. 2, an example of a base station 16 is illustrated. The base station 16 generally includes a base control system 26, e.g. a CPU, a baseband processor 28, transmit circuitry 30, receive circuitry 32, multiple antennas 34a, 34b and a network interface 36. The receive circuitry 32 receives radio frequency signals bearing information through a receive antenna 34a from one or more remote transmitters provided by mobile terminals 20 (illustrated in FIG. 3) and relay stations 22 (illustrated in FIG. 4). A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 28 processes the digitized received signal to extract the information or data bits conveyed in the received signal. This processing typically comprises demodulation, decoding, and error correction operations. As such, the baseband processor 28 is generally implemented in one or more digital signal processors ("DSPs") and/or application-specific integrated circuits ("ASICs"). The received information is sent across a wireless network via the network interface 36 or transmitted to another mobile terminal 20 serviced by the base station 16, either directly or with the assistance of a relay 22.

On the transmit side, the baseband processor 28 receives digitized data, which may represent voice, data, or control information, from the network interface 36 under the control of the base control system 26, and encodes the data for transmission. The encoded data is output to the transmit circuitry 30, where it is modulated by one or more carrier signals having a desired transmit frequency or frequencies. A power amplifier (not shown) amplifies the modulated carrier signals to a level appropriate for transmission, and delivers the modulated carrier signals to the transmit antennas 34b through a matching network (not shown). Modulation and processing details are described in greater detail below.

Figure 3:
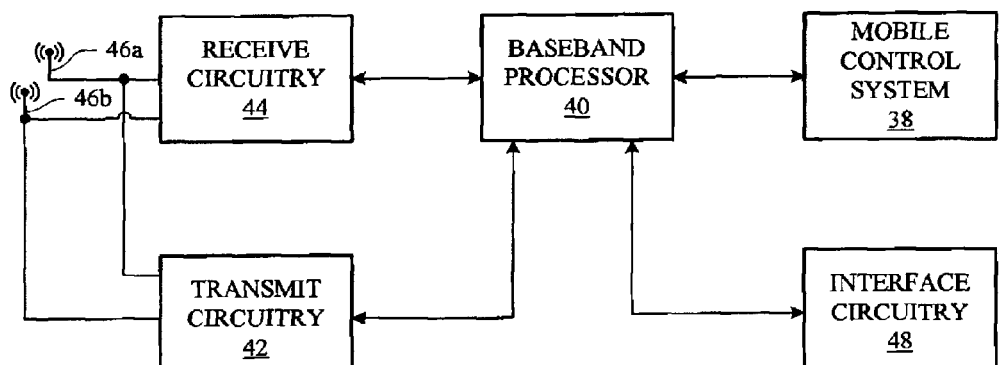
FIG. 3 is a block diagram of an exemplary mobile terminal constructed in accordance with the principles of the present invention.

With reference to FIG. 3, an example of a mobile terminal 20 is illustrated. Similarly to the base station 16, the mobile terminal 20 includes a mobile control system 38, e.g. a CPU, a baseband processor 40, transmit circuitry 42, receive circuitry 44, multiple antennas 46a, 46b and user interface circuitry 48. The receive circuitry 44 receives radio frequency signals bearing information through a receive antenna 46a from one or more base stations 16 and relays 22. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 40 processes the digitized received signal to extract the information or data bits conveyed in the received signal. This processing typically comprises demodulation, decoding, and error correction operations. The baseband processor 40 is generally implemented in one or more DSPs and/or ASICs.

For transmission, the baseband processor 40 receives digitized data, which may represent voice, video, data, or control information, from the mobile control system 38, which it encodes for transmission. The encoded data is output to the transmit circuitry 42, where it is used by a modulator to modulate one or more carrier signals at a desired transmit frequency or frequencies. A power amplifier (not shown) amplifies the modulated carrier signals to a level appropriate for transmission, and delivers the modulated carrier signal to the transmit antennas 46b through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform ("IFFT") on the information to be transmitted. For demodulation, the performance of a Fast Fourier Transform ("FFT") on the received signal recovers the transmitted information. In practice, the IFFT and FFT are provided by digital signal processing carrying out an Inverse Discrete Fourier Transform ("IDFT") and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 16 to the mobile terminals 20. Each base station 16 is equipped with "n" transmit antennas 34b (n>=1), and each mobile terminal 20 is equipped with "m" receive antennas 46a (m>=1). Notably, the respective antennas can be used for reception and transmission using appropriate duplexers or switches and are so labeled only for clarity.

When relay stations 22 are used, OFDM is preferably used for downlink transmission from the base stations 16 to the relays 22 and from relay stations 22 to the mobile terminals 20.

Figure 4:
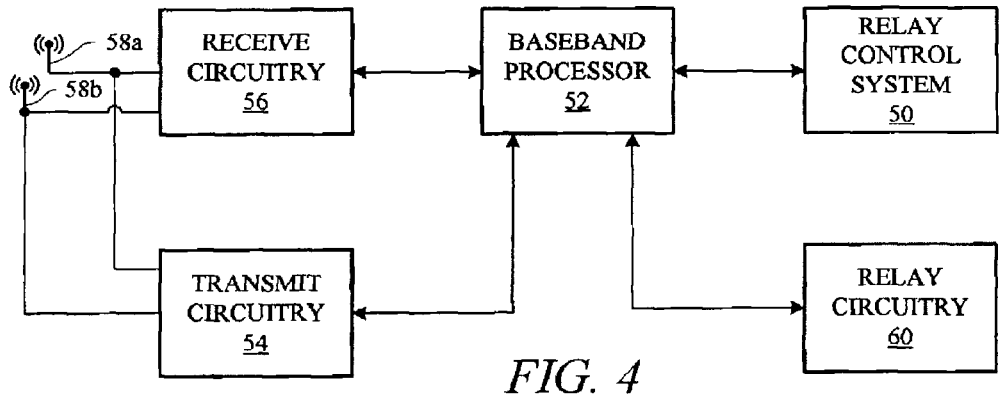
FIG. 4 is a block diagram of an exemplary relay station constructed in accordance with the principles of the present invention.

With reference to FIG. 4, an example of a relay station 22 is illustrated. Similarly to the base station 16, and the mobile terminal 20, the relay station 22 includes a relay control system 50, e.g. a CPU, a baseband processor 52, transmit circuitry 54, receive circuitry 56, multiple antennas 58a, 58b and relay circuitry 60. The relay circuitry 60 enables the relay 22 to assist in communications between a base station 16 and mobile terminals 20. The receive circuitry 56 receives radio frequency signals bearing information through a receive antenna 58a from one or more base stations 16 and mobile terminals 20. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 52 processes the digitized received signal to extract the information or data bits conveyed in the received signal. This processing typically comprises demodulation, decoding, and error correction operations. The baseband processor 52 is generally implemented in one or more DSPs and/or ASICs.

For transmission, the baseband processor 52 receives digitized data, which may represent voice, video, data, or control information, from the relay control system 50, which it encodes for transmission. The encoded data is output to the transmit circuitry 54, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the transmit antenna 58b through a matching network (not shown). Various modulation and processing techniques available to those skilled in the art are used for signal transmission between the mobile terminal 20 and the base station 16, either directly or indirectly via a relay station 22, as described above.

Figure 5:
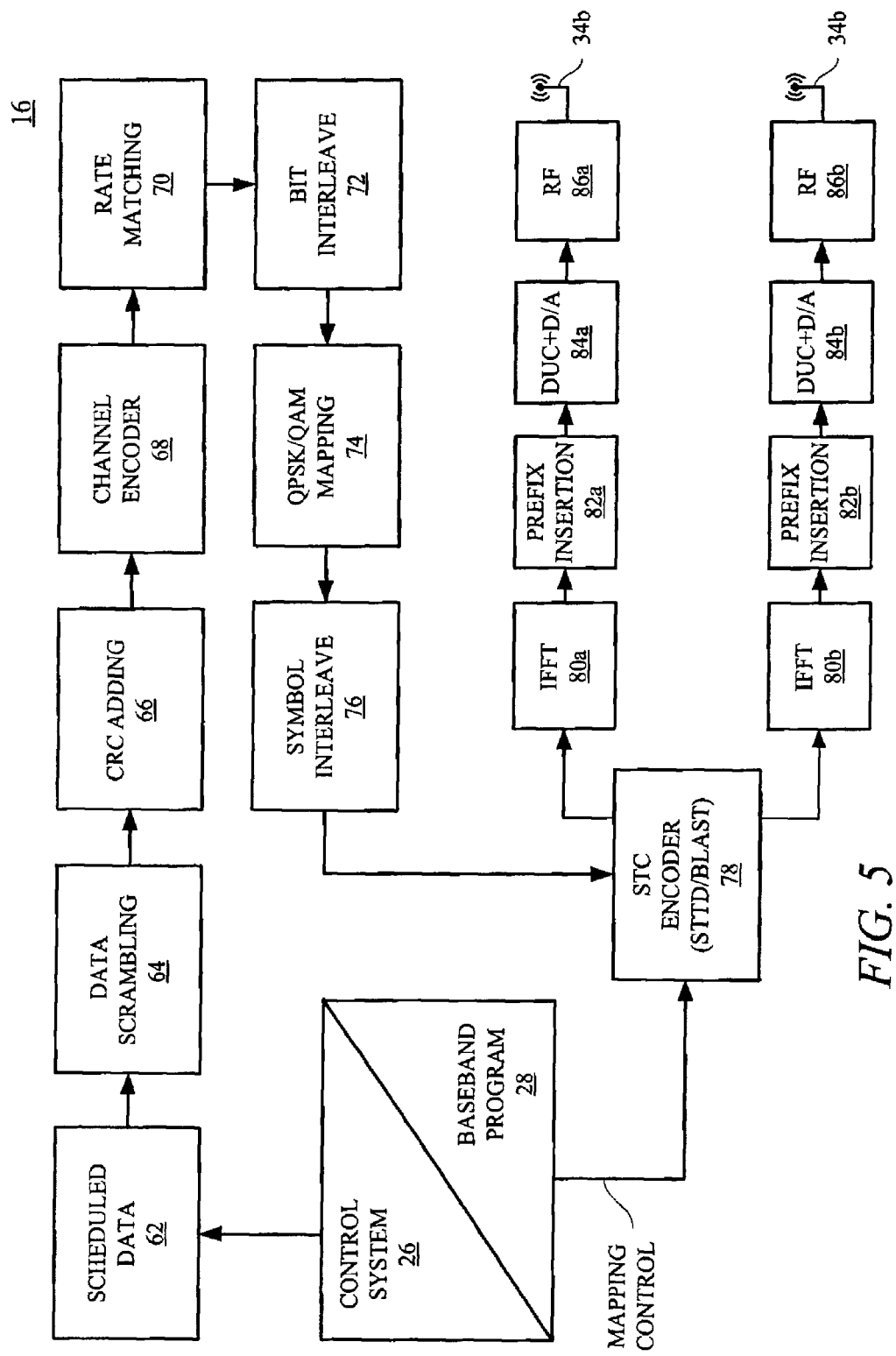
FIG. 5 is a block diagram of a logical breakdown of an exemplary OFDM transmitter architecture constructed in accordance with the principles of the present invention.

With reference to FIG. 5, a logical OFDM transmission architecture is provided. Initially, the base station controller 12 (See FIG. 1) sends data destined for transmission to various mobile terminals 20 to the base station 16, either directly or with the assistance of the relay station 22. The base station 16 may use channel quality indicators ("CQIs") associated with the mobile terminals 20 to schedule the data for transmission as well as select appropriate coding and modulation for transmitting the scheduled data. The CQIs may be obtained directly from the mobile terminals 20 or may be determined at the base station 16 using information provided by the mobile terminals 20. In either case, the CQI for each mobile terminal 20 is a function of the degree to which the channel amplitude (or response) varies across the OFDM frequency band.

The scheduled data 62, which is a stream of bits, is scrambled in a manner that reduces the peak-to-average power ratio associated with the data using data scrambling logic 64. A cyclic redundancy check ("CRC") for the scrambled data is determined and appended to the scrambled data using CRC adding logic 66. Channel coding is performed using channel encoder logic 68 to effectively add redundancy to the data to facilitate recovery and error correction at the mobile terminal 20. Again, the channel coding for a particular mobile terminal 20 is based on the CQI. In some implementations, the channel encoder logic 68 uses known Turbo encoding techniques. The encoded data is processed by rate matching logic 70 to compensate for the data expansion associated with encoding.

The bit interleaver logic 72 systematically reorders the bits in the encoded data to minimize the loss of consecutive data bits. The resultant data bits are systematically mapped into corresponding symbols depending on the chosen baseband modulation by mapping logic 74. Preferably, Quadrature Amplitude Modulation ("QAM") or Quadrature Phase Shift Key ("QPSK") modulation is used. The degree of modulation is preferably chosen based on the CQI for the particular mobile terminal 20. The symbols may be systematically reordered to further bolster the immunity of the transmitted signal to periodic data loss caused by frequency selective fading using symbol interleaver logic 76.

At this point, groups of bits are mapped into symbols representing locations in an amplitude and phase constellation. When spatial diversity is desired, blocks of symbols are processed by space-time block code ("STC") encoder logic 78, which modifies the symbols in a fashion making the transmitted signals more resistant to interference and more readily decoded at the mobile terminal 20. The STC encoder logic 78 processes the incoming symbols and provide "n" outputs corresponding to the number of transmit antennas 34b for the base station 16. The base control system 26 and/or baseband processor 28, as described above with respect to FIG. 2, provide a mapping control signal to control STC encoding. At this point, assume the symbols for the "n" outputs are representative of the data to be transmitted and are capable of being recovered by the mobile terminal 20.

For the present example, assume the base station 16 has two transmit antennas 32b (n=2) and the STC encoder logic 78 provides two output streams of symbols. Accordingly, each of the symbol streams that are output by the STC encoder logic 78 is sent to a corresponding IFFT processor 80a, 80b (referred to collectively herein as IFFT 80), illustrated separately for ease of understanding. Those skilled in the art will recognize that one or more processors may be used to provide such digital signal processing, alone or in combination with other processing described herein. The IFFT processors 80 preferably operate on the respective symbols to provide an inverse Fourier Transform. The output of the IFFT processors 80 provides symbols in the time domain. The time domain symbols are grouped into frames, which are associated with a prefix-by-prefix insertion logic 82a, 82b (referred to collectively herein as prefix insertion 82). Each of the resultant signals is up-converted in the digital domain to an intermediate frequency and converted to an analog signal via the corresponding digital up-conversion ("DUC") and digital-to-analog ("D/A") conversion circuitry 84a, 84b (referred to collectively herein as DUC+D/A 84). The resultant (analog) signals are simultaneously modulated at the desired RF frequency, amplified, and transmitted via the RF circuitry 86a, 86b (referred to collectively herein as RF circuitry 86) and antennas 34b. Notably, pilot signals known by the intended mobile terminal 16 are scattered among the sub-carriers. The mobile terminal 16, which is discussed in detail below, uses the pilot signals for channel estimation.

Figure 6:
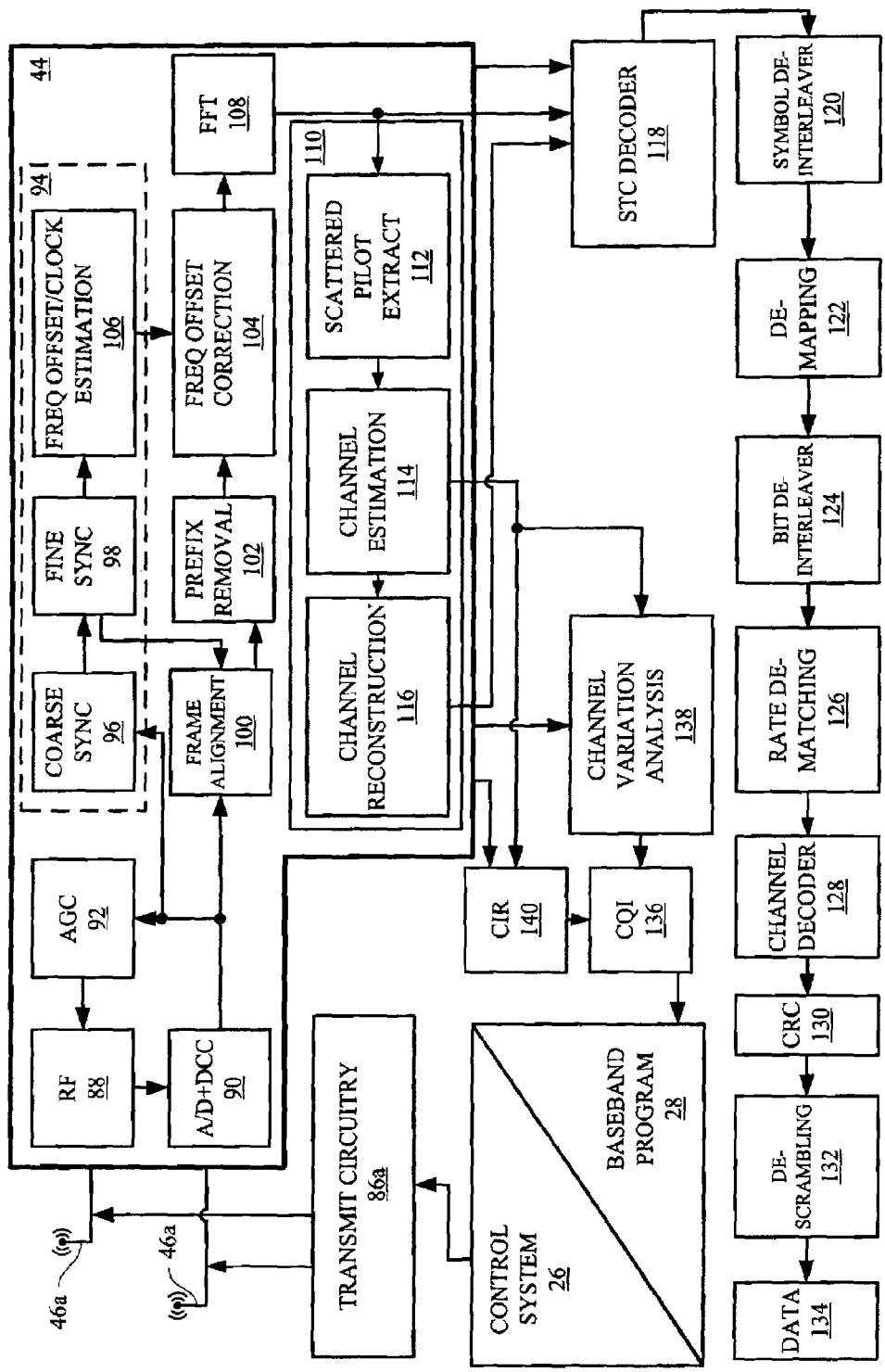
FIG. 6 is a block diagram of a logical breakdown of an exemplary OFDM receiver architecture constructed in accordance with the principles of the present invention.

Reference is now made to FIG. 6 to illustrate reception of the transmitted signals by a mobile terminal 20, either directly from base station 16 or with the assistance of relay 22. Upon arrival of the transmitted signals at each of the antennas 46a of the mobile terminal 20, the respective signals are demodulated and amplified by corresponding RF circuitry 88. For the sake of conciseness and clarity, only one of the two receive paths is described and illustrated in detail. Analog-to-digital (A/D) converter and down-conversion circuitry 90 digitizes and down-converts the analog signal for digital processing. The resultant digitized signal may be used by automatic gain control circuitry (AGC) 92 to control the gain of the amplifiers in the RF circuitry 88 based on the received signal level.

Initially, the digitized signal is provided to synchronization logic 94, which includes coarse synchronization logic 96, which buffers several OFDM symbols and calculates an autocorrelation between the two successive OFDM symbols. A resultant time index corresponding to the maximum of the correlation result determines a fine synchronization search window, which is used by fine synchronization logic 98 to determine a precise framing starting position based on the headers. The output of the fine synchronization logic 98 facilitates frame acquisition by frame alignment logic 100. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 102 and resultant samples are sent to frequency offset correction logic 104, which compensates for the system frequency offset caused by the unmatched local oscillators in the transmitter and the receiver. Preferably, the synchronization logic 94 includes frequency offset and clock estimation logic 106, which is based on the headers to help estimate such effects on the transmitted signal and provide those estimations to the correction logic 104 to properly process OFDM symbols.

At this point, the OFDM symbols in the time domain are ready for conversion to the frequency domain using FFT processing logic 108. The results are frequency domain symbols, which are sent to processing logic 110. The processing logic 110 extracts the scattered pilot signal using scattered pilot extraction logic 112, determines a channel estimate based on the extracted pilot signal using channel estimation logic 114, and provides channel responses for all sub-carriers using channel reconstruction logic 116. In order to determine a channel response for each of the sub-carriers, the pilot signal is essentially multiple pilot symbols that are scattered among the data symbols throughout the OFDM sub-carriers in a known pattern in both time and frequency.

Figure 7:
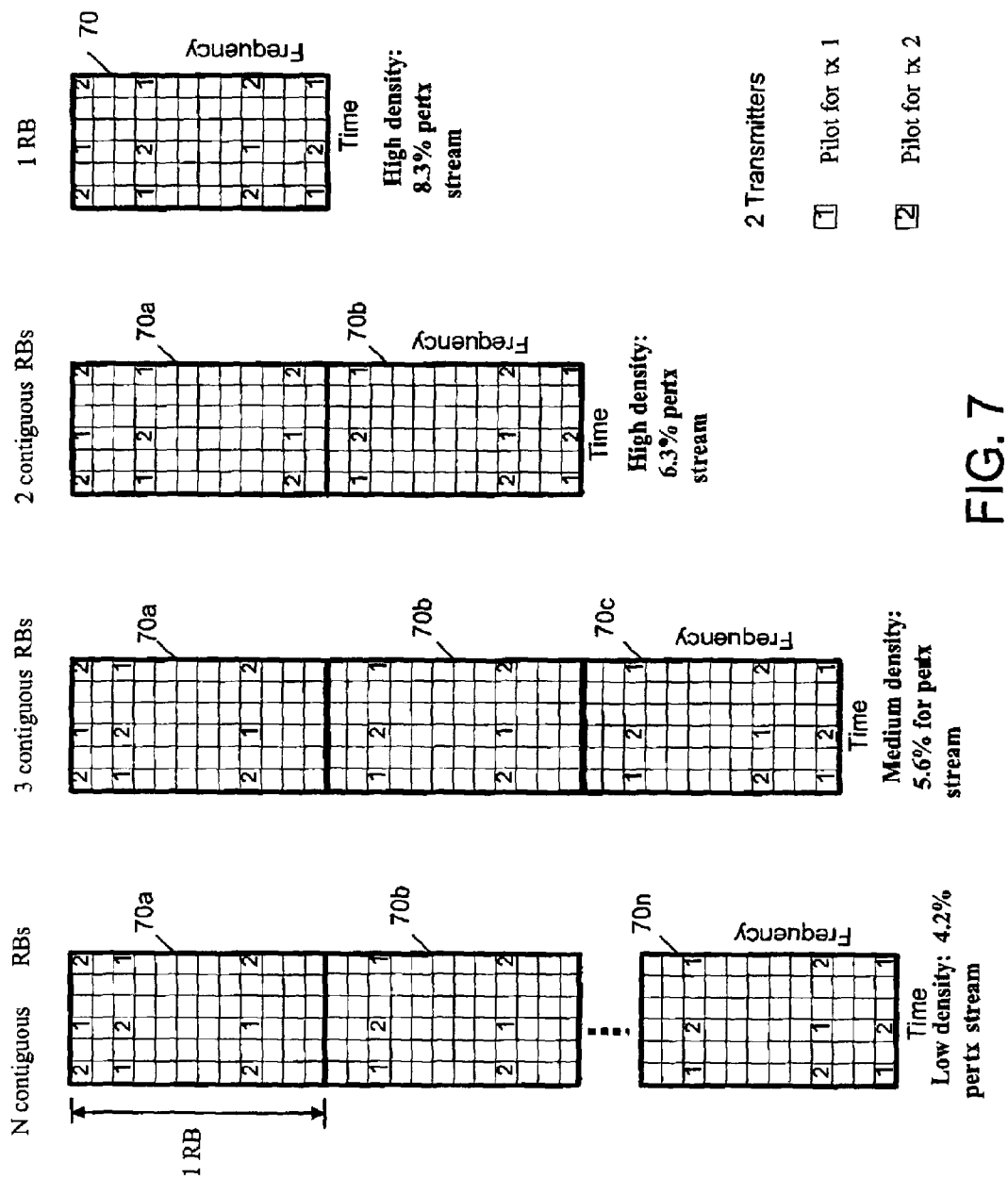
FIG. 7 illustrates resource blocks having uplink pilot designs for two transmitter systems in accordance with the principles of the present invention.
Figure 8:
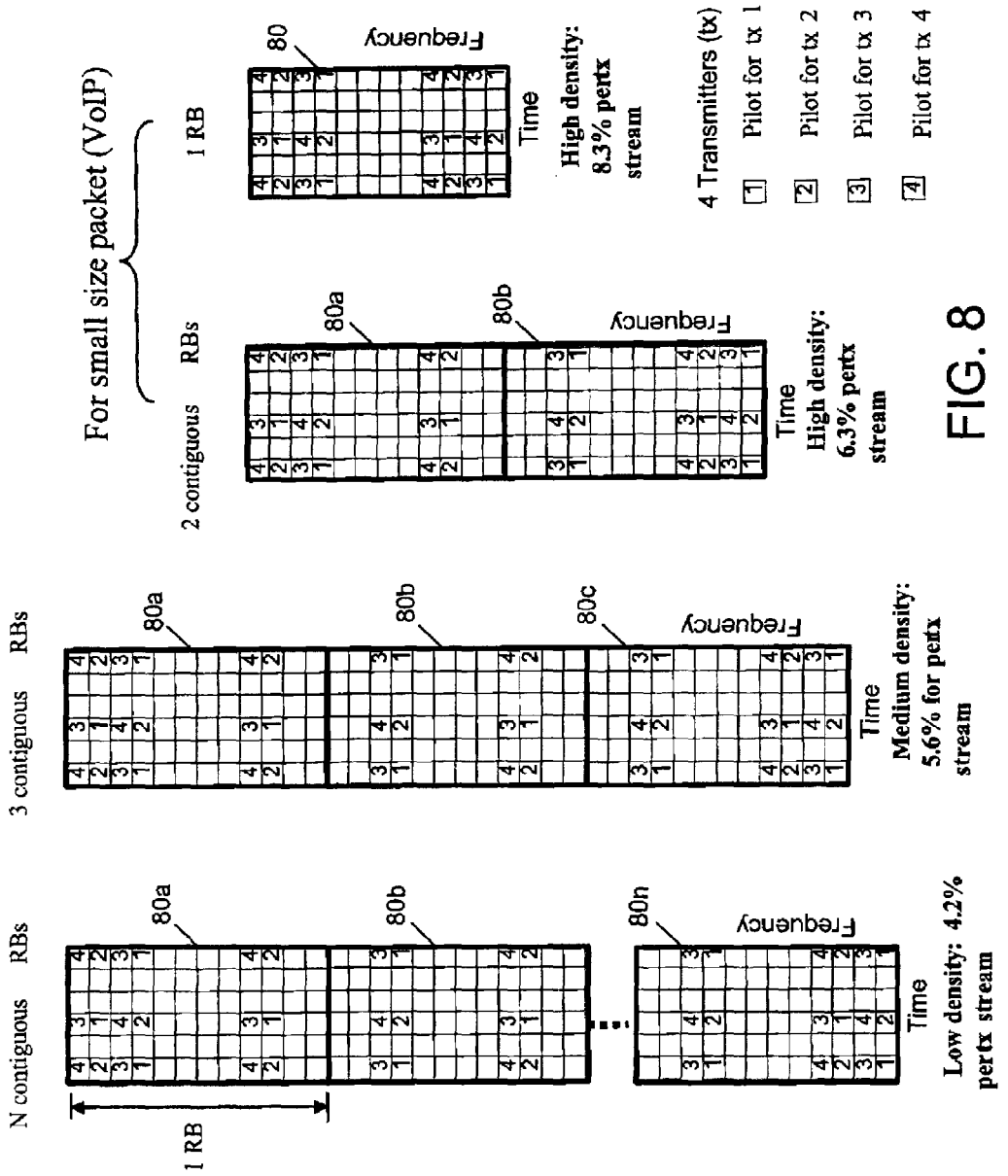
FIG. 8 illustrates resource blocks having uplink pilot designs for four transmitter systems in accordance with the principles of the present invention.

FIGS. 7 and 8 illustrate resource blocks ("RBs") 70, 70a-70n, 80, 80a-80n (hereinafter "RB 70,80") having uplink pilot designs. The RB 70,80 include pilot symbols arranged in patterns according to embodiments of the invention. An RB is defined as a smallest unit for channelization and is used mostly for small packet transmission (VoIP). The RB may be configured in various sizes such as 12×6, 18×6, and 6×4, among other sizes. A basic channel unit (BCU) is the smallest unit of assignment for channelization. The pilot symbol patterns are arranged in the RB 70,80 to include a boundary pilot pattern and an adaptive density and allocation pattern. The RB 70,80 includes a horizontal axis that represents time and a vertical axis that represents frequency. The pilot symbol patterns are employed for channel estimation, data demodulation, and sounding, among other purposes. The pilot symbol patterns for a contiguous resource region may include a scattered pilot symbol pattern and pilot symbols allocated at boundaries of the resource region.

FIGS. 7 and 8 illustrate multiple RB configurations having pilot symbol patterns with different density configurations for a two transmitter system and a four transmitter system, respectively. The pilot symbol density and pilot symbol pattern may be configured in time and frequency to accommodate different contiguous resource sizes. The pilot symbol for the first transmitter is identified by "1," the pilot symbol for the second transmitter is identified by "2," the pilot symbol for the third transmitter is identified by "3," the pilot symbol for the fourth transmitter is identified by "4." The RB 70,80 includes areas for pilot symbols and areas for data signals. The invention seeks to reduce RB 70,80 overhead by maximizing area (e.g., resources) for data signals and reducing area for pilot symbols. Additionally, the uplink pilot design for a diversity zone and a localized zone may be unified by designing pilot structures based on adaptive density and allocation. Pilot symbol patterns having different density values may be generated for different numbers of contiguous RBs 70,80. The pilot symbol pattern and density value may be chosen based on the size of the contiguous resource and a multi-antenna transmission and reception (MIMO) mode.

According to embodiments illustrated in FIGS. 7 and 8, pilot symbol patterns may be generated with different density values for multiple contiguous RBs 70,80. A stand alone RB 70,80 having a high density pilot symbol pattern may be coupled with other RBs 70,80 to provide a low density pilot symbol pattern. The pilot symbol pattern for a stand alone RB 70,80 may include pilot symbols allocated on the boundary to form a highest density pilot symbol pattern. The stand alone RB pilot pattern may be extended to a pilot pattern for two RBs 70,80, which provides a lower density pilot symbol pattern. The two stand alone RBs 70,80 may be concatenated, either in frequency or in time. In order to reduce pilot symbol pattern density, redundant pilot symbols may be eliminated at the boundary between two RBs 70,80. The spacing of the pilot symbols may be adjusted in frequency and/or in time to provide uniform spreading of pilot symbols. This method may be used to extend pilot symbol patterns to multiple RBs 70,80. As the number of contiguous RBs 70,80 increase, the pilot symbol density pattern for the RBs 70,80 may change from a high density pattern to a low density pattern. The total pilot symbol spacing may be adjusted in the frequency and time directions to remain smaller than pre-defined maximum values.

According to an alternative embodiment, a number of contiguous RBs 70,80 may be provided that collectively include a low density pilot symbol pattern. In this case, the contiguous RBs 70,80 may be transformed to a stand alone RB 70,80 having a high density pilot symbol pattern. Pilot symbols may be uniformly allocated in frequency and time, with maximum pilot spacing provided for N RBs (usually N>3). Boundary pilot symbols may be allocated in time and frequency to minimize extrapolation. The N RBs 70,80 may be reduced to N−1 RBs 70,80 by maintaining a pilot symbol pattern having boundary pilot symbols. Pilot symbol spacing may be adjusted to uniformly spread the pilot symbols in the time and frequency directions. In this case, the pilot symbol density for the RBs 70,80 may change from low density pattern to a high density pattern. This process may continue until single RB 70,80 remains having a high pilot symbol density.

FIGS. 7 and 8 illustrate several pilot symbol density patterns. A low density pilot symbol pattern (3.1%<density<5.3% for one transmitter) may be realized for more than one contiguous BCU, more than 3 contiguous RBs, or for more than one sub frame. A medium density pilot symbol pattern (density ~5.6% for one transmitter) may be realized for one BCU or 3 contiguous RBs. A high density pilot symbol pattern (6.3%<density<8.3%) may be realized for less than 3 RBs. The high density pilot symbol pattern may be used, for example, for VoIP transmission. The invention enables the pilot symbol pattern to adjust in time and frequency based on the size of contiguous RBs 70,80.

Referring again to FIG. 6, the processing logic 110 compares the received pilot symbols with the expected pilot symbols in certain sub-carriers at certain times to determine a channel response for the sub-carriers in which pilot symbols were transmitted. The results may be interpolated to estimate a channel response for the remaining sub-carriers for which pilot symbols are not provided. The actual and interpolated channel responses may be used to estimate an overall channel response, which includes the channel responses for the sub-carriers in the OFDM channel.

The frequency domain symbols and channel reconstruction information, which are derived from the channel responses for each receive path are provided to an STC decoder 118, which provides STC decoding on both received paths to recover the transmitted symbols. The channel reconstruction information provides equalization information to the STC decoder 118 sufficient to remove the effects of the transmission channel when processing the respective frequency domain symbols.

The recovered symbols are placed back in order using symbol de-interleaver logic 120, which corresponds to the symbol interleaver logic 76 of the base station 16 transmitter. The de-interleaved symbols are then demodulated or de-mapped to a corresponding bit stream using de-mapping logic 122. The bits are then de-interleaved using bit de-interleaver logic 124, which corresponds to the bit interleaver logic 72 of the base station 16 transmitter architecture. The de-interleaved bits are then processed by rate de-matching logic 126 and presented to channel decoder logic 128 to recover the initially scrambled data and the CRC checksum. Accordingly, the CRC logic 130 removes the CRC checksum, checks the scrambled data in traditional fashion, and provides it to the de-scrambling logic 132 for descrambling using the known base station de-scrambling code to recover the originally transmitted data 134.

While recovering the data 134, a CQI 136 or at least information sufficient to create a CQI at the base station 16 is determined by channel variation analysis logic 138 and transmitted to the base station 16. As noted above, the CQI 134 may be a function of the carrier-to-interference ratio ("CIR") 140, as well as the degree to which the channel response varies across the various sub-carriers in the OFDM frequency band. For this embodiment, the channel gain for each sub-carrier in the OFDM frequency band used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

According to one embodiment, the invention provides an uplink control structure for OFDM systems that enables mobile terminals 20 to communicate with the base stations 16. The control structure includes an uplink acknowledge (UL ACK) channel and a dedicated control channel that feeds information back, such as channel quality indicator (CQI) information, pre-coding matrix index (PMI) information and rank information, among other information. According to one embodiment, the mobile terminals 20 may employ the UL ACK channel for initial access to the OFDM system, for bandwidth requests, to trigger continuation of negotiated service, and for proposed allocation of a re-configuration header, among other purposes.

A fixed number of resources may be allocated for the UL ACK channels. A set of ACK channels is defined for all unicast assignments and a separate set of ACK channels is defined for group assignments. The ACK channels that are used for a given packet transmission are determined by the partition number and the layer. The ACK signals are transmitted over several ACK tiles, where an ACK tile is defined as a group of contiguous tones or sub-carriers. The value of the ACK signals may be determined by either non-coherent detection or coherent detection. An orthogonal spreading code may be used to multiplex multiple ACK signals onto the same ACK tile.

An uplink ("UL") control channel structure supports UL ACK channels for both unicast assignments and group assignments. The UL control channel structure also supports multiple ACKs for different packets that are transmitted on the same resources, as in multi-codeword MIMO ("MCW-MIMO") or multi-user MIMO ("MU-MIMO"). The UL control channel also provides feedback for frequency selective scheduling and pre-coding, including for simple diversity assignments.

A fixed number of resources may be allocated for the UL dedicated control channel. The resources are divided into UL control tiles, wherein the number of tiles allocated to a user depends on the amount of feedback requested. The allocated tiles may be spread over the band to obtain frequency diversity. The UL control information is CRC protected and is scrambled by the user ID. The content of the information can change each feedback instance to accommodate event driven control information such as a bandwidth request.

A UL random access ("RA") channel may be provided to enable the user to initially gain access to the system through one of several physical control structures. According to one embodiment, the UL random access channel is a designated resource. The UL random access channel may be a contention based channel for multiple mobile terminals 20 to request access/bandwidth. A designated resource may be allocated for these access requests. The access request may be spread or repeated across the resources that are used exclusively for random access and bandwidth requests. The mobile station 20 may randomly select from one sequence and location if multiple possibilities are available.

According to one embodiment, the mobile terminal 20 may randomly select from one of L sequences, which spans N RBs 70,80. Alternatively, the sequence length L may be chosen to confine a full sequence within an RB 70,80. By confining the spreading sequence to one RB 70,80, the spreading sequences maintain orthogonality as the RB 70,80 is virtually frequency flat as the RB contains physical contiguous tones. The spreading sequences may be repeated in each RB 70,80 to gain diversity.

If many resources are assigned for uplink control, the resources may be divided into M time-frequency blocks for random access. In this case, the number of distinct codes/resource per sub frame is LM, where the value of M may be dynamically specified by the base station 16. In some embodiments, a sub-frame within a superframe (or otherwise specified as set of F frames) is also randomly selected, wherein the number of distinct codes/resource/sub frames per superframe is defined as LMF.

Another physical control structure includes overlaying the random access requests with UL control signals. The access request may be spread or repeated across the resources used for uplink control, such as CQI, among other uplink control. The mobile terminal 20 may randomly select from one sequence and location if multiple possibilities are available. For example, the mobile terminal 20 may randomly select from one of L sequences, where L is less than or equal to the RB size. By confining the spreading sequence to one RB 70,80, the spreading sequences maintain orthogonality as the RB 70,80 is virtually frequency flat as the RB 70,80 includes physical contiguous tones or sub-carriers. The length-L sequence is completely repeated on each of the N RBs 70,80. Coherent combining of each sequence repetition may improve detection at the base station 16.

While overlaying the RA request and UL signals, the resources may be divided into M time-frequency blocks for random access if many resources are assigned for uplink control. A number of distinct codes or resources per sub-frame is LM. The values of N and M may be dynamically specified by the base station 16. In some embodiments, a sub-frame within the superframe (or otherwise specified as a set of F frames) is also randomly selected. In some embodiments, the sequences span the N RBs 70,80. The sequence length in these cases is LN and the number of distinct codes or resource per sub frame is LNM.

In some embodiments, the L sequences are an orthogonal set of spreading sequences, wherein the L-sequences may be divided into two types of indications. A first type includes a system access request without a previously assigned mobile terminal ID and a second type includes a system access request with an assigned mobile terminal ID. If a mobile terminal 20 is provided access to the system, a down link (DL) control segment access grant may be scrambled by the sequence/resource block ID. The base station 16 may attempt interference cancellation to remove the RA channel from UL control.

Another physical control structure includes overlaying the RA channel over the wideband UL resources. The request is spread or repeated across the UL channel, possibly across the entire bandwidth. The random access operation for users may be assigned to one length L sequence and one location, if multiple possibilities are available.

A random access channel may be assigned one length L sequence for use by all users. The total resources NT may be divided into M time-frequency blocks for random access. The access sequence, through spreading and repetition, may span NT/M=N RB's (e.g. N=3). The mobile terminal 20 randomly selects one of the M, wherein the number of distinction resource per sub frame is M. The sub frame for a request is also randomly selected.

The sequences for random access may be an orthogonal set of spreading sequences. Two sequences may be defined for two types of indications. A first type includes a system access request without a previously assigned mobile terminal ID and a second type includes a system access request with an assigned mobile terminal ID. If a mobile terminal 20 is provided access to the system, a down link (DL) control segment access grant may be scrambled by the sequence/resource block ID. The base station 16 may attempt interference cancellation to remove the RA channel from UL control. The base station 16 may try decoding UL control and traffic transmissions with and without an assumption that an RA was sent.

Once a mobile terminal 20 accesses the system, the mobile terminal 20 may request resources on the UL to transmit information to the base station 16. The invention provides the mobile terminal 20 with several options for performing the UL resource request. Parameters for a first transmission may be specified by a bandwidth request, the parameters may be set to default based on capability negotiation, the parameters may be set to a previous configuration based on renewal, or the parameters may be set in some other manner. The mobile terminal 20 may change the assignment parameters by including an additional re-configuration message encoded with data that takes effect at the start of the next packet transmission. This takes advantage of HARQ for the control message.

According to one embodiment, a field may be appended to a data packet prior to encoding. After the data packet is decoded at the base station 16, the header is located to determine if an additional re-configuration message has be added to the packet with re-configuration information. Header operations may include a 2-bit header field that indicates the presence and type of service re-configuration message. For example, '00' may indicate no change to a configuration and no re-configuration message; '01' may indicate no change to a configuration, no re-configuration message, and extend service for another packet; '10' may indicate that a re-configuration message of Type 1 is attached; and '11' may indicate that a re-configuration message of Type 2 is attached.

A re-configuration message may include changes to an exiting assignment or to future assignments, including mobile power header room, update of capabilities, request for different MIMO mode, request for different MCS Indication of mobile data backlog size, indication to continue assigning UL resources until data backlog is emptied, resource size specification, delay requirement, quality of service ("QoS"), and requests of an additional service/resources, among other transmission parameters.

The mobile terminal 20 may randomly select an RA signaling ID. A signaling ID may be a specific spreading sequence, a time-frequency location, a time slot, an interlace, or other signaling ID. The set of signaling ID options are known to users and also the index associated with each signaling ID option.

In response to a random access channel signal, the base station 16 may assign one or more of a user ID to the user, an initial UL resource for the mobile to provide information, user equipment capabilities, a DL resource assignment requesting information from the mobile terminal and additional details, such as group assignment, base station procedures, among other parameters. The assignment message may carry user ID information.

A message sent to the mobile terminal 20 from the base station 16 may identify the base station 16 using a randomly selected signaling ID option that is selected by the user for the RA. For example, if the control channels are generally scrambled in some manner by the user ID in response to a RA, the base station 16 will send a control message scrambled by the index of the randomly selected signaling ID, such as sequence index, sequence location, etc.

In another embodiment, some signaling IDs may be reserved for users that have been assigned user IDs. For example, a user may be in a hand-off operation and may be accessing a new serving sector. A user may select from a set of random access signaling IDs if an assigned user ID is not provided. Alternatively, a user may select from a different subset of signaling options if the user does have a user ID. In response, the base station 16 may send a control message that is scrambled by the RA signal index and includes a user ID if the mobile terminal 20 has sent a signaling option indicating a user ID is not provided. Alternatively, if the mobile has sent a signaling option indicating it does have a user ID, then the base station 16 may send a control message that is scrambled by the RA signal index without a user ID. The mobile terminal 20 may indicate the user ID in the next UL transmission for user equipment capabilities, etc.

According to one embodiment, the header and optionally a message body may be added to a first packet transmission. Alternatively, the header and optionally a message body may be added to a first packet transmission and every Nth packet afterwards, where N can be from 1 to infinity. The base station 16 may provide the mobile terminal 20 with a ACK/NAK of packet transmission to indicate that a re-configuration message was correctly received.

During an assignment of the mobile terminal 20, users may embed a header on a data packet transmission that provides details on configuration or re-configuration. The request by the mobile terminal 20 for UL resources may be made on dedicated resources within UL control tiles. These resource sizes may be different for different frames according to a pre-determined pattern. The sizes may be known at the mobile terminal 20 and the base station 16, so signaling is not needed after configuration.

According to one embodiment, the resource request may occupy a field that is reserved for another message (CQI, ACK/NAK, precoder index, etc.). The presence of a request may be specified by the UL control message type. The mobile terminal 20 may set this type to a message configuration that includes space for a resource assignment. As a result, the size of the message may not be changed from the specified size for that sub frame. The presence of the request field may be dynamic, but may not affect the pre-determined size of the user's UL control. A resource request may be encoded with other UL control data so that resource requests may be reliably received.

The request may have multiple forms for a given system. In a first embodiment, the resource request may be a single "on/off" indication. Details of an assignment may be given in a re-configuration message or may be known from previous or default configurations. Alternatively, the resource request may be a message, where details of assignments are indicated, such as delay constraints, QoS, packet backlog, and resource size, among other assignments. Details of an assignment may be given in a re-configuration message or may be known from previous or default configurations. For example, resources may be specified by a secondary broadcast channel, UL resources may be allocated across distributed RB blocks, bandwidth requests may be 4-10 bits indicating QoS and a first transmission spectral efficiency or a mobile terminal 20 buffer size, a bandwidth request may occupy a field otherwise assigned for another purpose, such as DL CQI feedback, or UL resources may be encoded with other UL control data for users so that a bandwidth request may be reliably received.

According to an alternative embodiment, users may be assigned one of the random access signaling IDs (e.g., channel sequences or location) after accessing a system. A resource request may use the same sequence or channel configurations. As with the RA channel, users also may be assigned specific sub frames for resource request opportunities. The assigned signaling may be a unique identifier for a user's resource request. In a first example, a set of signaling IDs may be reserved for resource requests and may not be used for RA requests. The assigned sequence or location may be a unique identifier for a user's resource request. A user may be assigned signaling IDs to identify a bandwidth request or a resource request. Alternatively, users may be assigned signaling IDs from a full set of RA signaling IDs. The sequence may be scrambled by resource request ID to identify as BW or resource request. The assigned sequence, location, or scrambling may be a unique identifier for a user's resource request. Users may be assigned multiple signaled IDs for different configured services, such as VoIP and http traffic resource requests, among other configured services. If the user has another mechanism for obtaining resource requests and opportunities for resource requests are frequent, the user may not be assigned signaling for transmitting resource requests in this manner.

According to yet another embodiment, a UL bandwidth or resource request may use resources that are specified persistently. One or more RBs and multiple RBs may be distributed to provide diversity. A UL bandwidth or resource may be overlaid with other traffic on a same resource as a traffic signal or a control signal. If the user has another mechanism for resource requests and opportunities for requests are frequent, the user may not be assigned signaling for transmitting resource requests in this manner. UL bandwidth and resource requests for the mobile terminal 20 may include 4-10 bits, with an initial message containing limited fields, such as QoS and a first transmission spectral efficiency or a mobile terminal buffer size including CRC. The UL bandwidth requests and resource requests for a mobile terminal 20 are intended to be reliable signaling with diversity, with interference cancellation used at the base station 16. Users may be separated by locations of RBs, sub frame, and assigned sequences. Regarding sequences, each user may be assigned a sequence block to use. In other embodiments, users may be assigned a same set of sequences to facilitate detection at the base station 16. Alternatively, orthogonal sequences such as Zadoff-Chu or Walsh sequences may be used. The sequence length may be less than the length of the RB. If N RBs are assigned for each resource request channel, it may be repeated over all RBs. Alternatively, the sequence may be spread over all N RBs.

The mobile terminal 20 may send a request for service signal. The message size may be minimal as it indicates a renewal or continuation of a configured service. According to a first option, the service may be renewed through a single message after the mobile terminal receives a UL assignment for a given type of service. The message may be a simple ON/OFF toggle to renewal service with previous or existing parameters. The message may be sent in a persistently assigned UL control resource space and the message type may indicate that the service renewal is being signaled. The mobile terminals 20 may be assigned multiple messages to toggle multiple services, parameters of renewal for first transmission may be set to a default and a re-configuration signal in first transmission may provide parameter changes.

Alternatively, a scrambled ID may be provided to the mobile terminal 20 for a UL renewal request. After the mobile terminal 20 receives a UL assignment for a given type of service, the service may be renewed through a single message. The message may be a simple ON/OFF toggle to renew service with previous or existing parameters. The message may be sent using resource requests in random access space to renew service to last configuration parameters. The mobile terminals 20 may be assigned multiple messages to toggle multiple services. The parameters of renewal for a first transmission may be set to a default.

Figure 9:
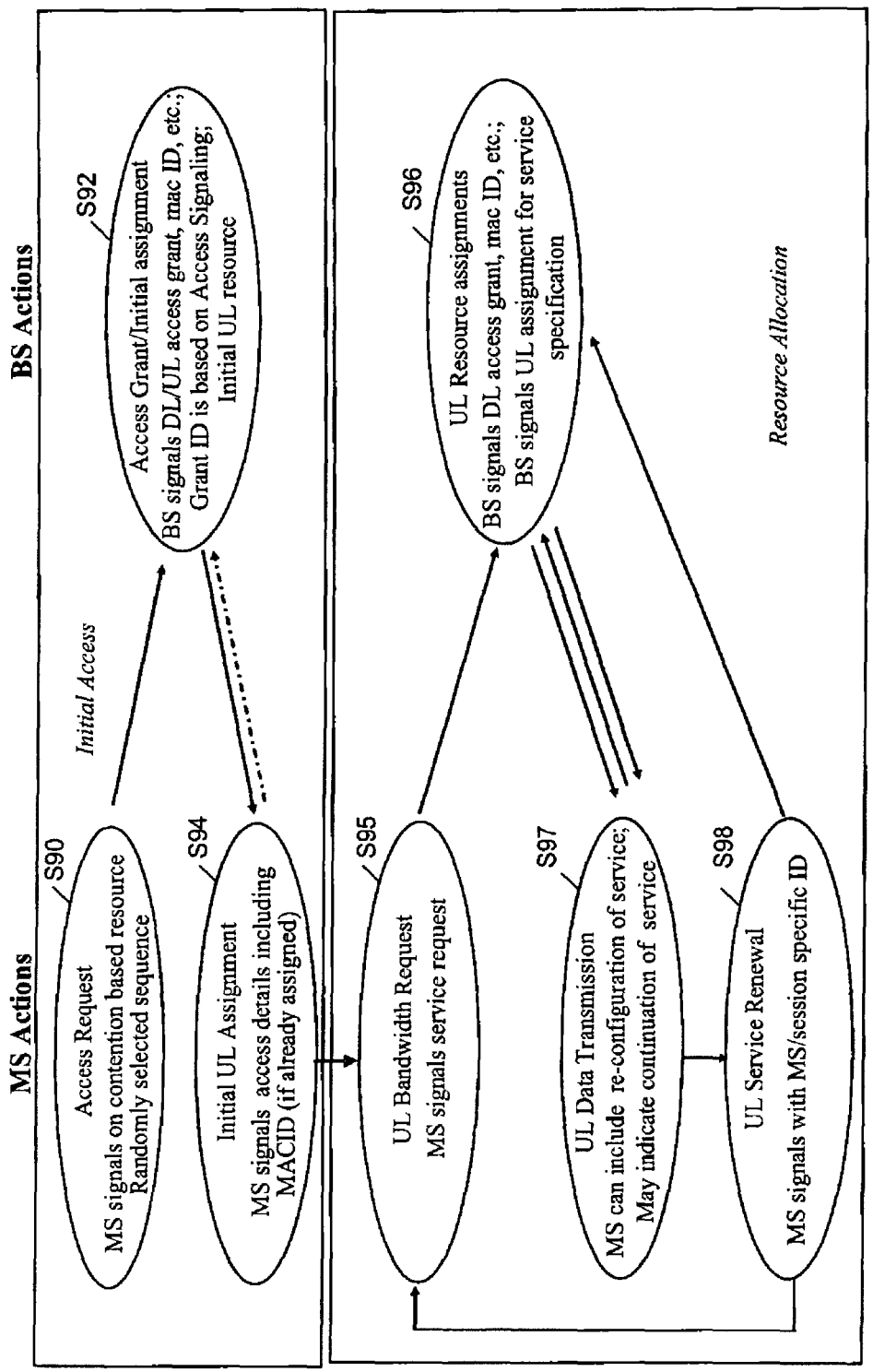
FIG. 9 illustrates a flow diagram of the mobile terminal access and uplink resource allocation in accordance with the principles of the present invention.

FIG. 9 illustrates an access and uplink resource allocation flow diagram between the mobile terminals 20 and the base station 16. The mobile terminals 20 initiate an access request to the base station 16 using a randomly selected sequence (step S90). The base station 16 provides the mobile terminals 20 with an access grant and an initial assignment (step S92). The mobile terminals 20 receive an initial UL assignment with a user ID and resource allocations (UL and/or DL) (step S94). The mobile terminals 20 submit a UL bandwidth request to the base station 16 (step S95). The base station 16 provides UL resource assignments (step S96). The mobile terminal 20 performs UL data transmission, including re-configuration of service and continuation of service (step S97). If the mobile terminal 20 is moved into a different cell, then a UL service renewal request may be sent to the base station (step S98).

The invention may be realized in hardware, software, or a combination of hardware and software. Any kind of computing system, or other apparatus adapted for carrying out the methods described herein, is suited to perform the functions described herein.

A typical combination of hardware and software could be a computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The invention claimed is:

1. A method of providing uplink control in a wireless communication network, the wireless communication network including at least one base station that is communicatively coupled to at least one mobile terminal, the method comprising:
   providing a dedicated random access channel to communicatively couple the at least one base station and the at least one mobile terminal;
   initiating the at least one mobile terminal to select a random access signaling identification;
   generating a resource request at the at least one base station to receive uplink resource information from the at least one mobile terminal;
   receiving an initial access information request from the at least one mobile terminal to configure a base station connection; and
   receiving by the at least one base station, when the at least one mobile terminal moves to a different cell, a service renewal request.

2. The method according to claim 1, wherein selecting the random access signaling identification includes embedding a header on a packet transmission communicated from the at least one mobile terminal to the at least one base station.

3. The method according to claim 2, wherein the header on the packet transmission selects a sequence length from a single resource block.

4. The method according to claim 2, wherein the header on the packet transmission selects a sequence length from a plurality of resource blocks.

5. The method according to claim 1, wherein the uplink resource information includes at least one of a channel quality indicator, a pre-coding matrix index and a rank.

6. The method according to claim 1, wherein the initial access information request includes at least one of a bandwidth request, continuation of service request and allocation of a re-configured header.

7. A system for providing uplink control in a wireless communication network, the system comprising:
   a base station, comprising:
      a processing element;
      a storage medium, coupled to the processing element; and
      at least one antenna, coupled to the processing element;
      wherein the storage medium stores program instructions executable by the processing element to:
      provide a dedicated random access channel to communicatively couple the base station and a mobile terminal using the at least one antenna;
      initiate the mobile terminal to select a random access signaling identification;
      generate a resource request at the base station to receive uplink resource information from the mobile terminal;
      receive an initial access information request from the mobile terminal to configure a base station connection; and
      receive, by the base station, when the mobile terminal moves to a different cell, a service renewal request.

8. The system according to claim 7, wherein selecting the random access signaling identification includes embedding a header on a packet transmission communicated from the mobile terminal to the base station.

9. The system according to claim 8, wherein the header on the packet transmission selects a sequence length from a single resource block.

10. The system according to claim 8, wherein the header on the packet transmission selects a sequence length from a plurality of resource blocks.

11. The system according to claim 7, wherein the uplink resource information includes at least one of a channel quality indicator, a pre-coding matrix index and a rank.

12. The system according to claim 7, wherein the initial access information request includes at least one of a bandwidth request, continuation of service request, and allocation of a re-configured header.

13. A non-transitory computer readable storage medium that stores program instructions executable by a processing element of a base station to perform:
   providing a dedicated random access channel to communicatively couple the base station and a mobile terminal;
   initiating the mobile terminal to select a random access signaling identification;
   generating a resource request at the base station to receive uplink resource information from the mobile terminal;
   receiving an initial access information request from the mobile terminal to configure a base station connection; and
   receiving by the base station, when the mobile terminal moves to a different cell, a service renewal request.

14. The non-transitory computer readable storage medium according to claim 13, wherein selecting the random access signaling identification includes embedding a header on a packet transmission communicated from the mobile terminal to the base station.

15. The non-transitory computer readable storage medium according to claim 14, wherein the header on the packet transmission selects a sequence length from a single resource block.

16. The non-transitory computer readable storage medium according to claim 14, wherein the header on the packet transmission selects a sequence length from a plurality of resource blocks.

17. The non-transitory computer readable storage medium according to claim 13, wherein the uplink resource information includes at least one of a channel quality indicator, a pre-coding matrix index and a rank.

18. The non-transitory computer readable storage medium according to claim 13, wherein the initial access information request includes at least one of a bandwidth request, continuation of service request, and allocation of a re-configured header.

* * * * *